US012729159B2

(12) United States Patent
Godefroid et al.

(10) Patent No.: US 12,729,159 B2
(45) Date of Patent: Sep. 8, 2026

(54) COMPOSITION FOR INSULATING COATING

(71) Applicant: SAINT-GOBAIN ISOVER, Courbevoie (FR)

(72) Inventors: Julie Godefroid, Paris (FR); Jérémy Becquet, Sivry-Courtry (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 325 days.

(21) Appl. No.: 18/555,433

(22) PCT Filed: Apr. 11, 2022

(86) PCT No.: PCT/FR2022/050677
§ 371 (c)(1),
(2) Date: Oct. 13, 2023

(87) PCT Pub. No.: WO2022/219275
PCT Pub. Date: Oct. 20, 2022

(65) Prior Publication Data

US 2024/0199489 A1 Jun. 20, 2024

(30) Foreign Application Priority Data

Apr. 14, 2021 (FR) ....................................... 2103863

(51) Int. Cl.

| | |
|---|---|
| ***C04B 20/00*** | (2006.01) |
| ***C04B 7/02*** | (2006.01) |
| ***C04B 11/30*** | (2006.01) |
| ***C04B 24/42*** | (2006.01) |
| ***C04B 28/04*** | (2006.01) |
| ***C04B 28/06*** | (2006.01) |
| ***C04B 28/14*** | (2006.01) |
| ***C04B 103/65*** | (2006.01) |
| ***C04B 111/00*** | (2006.01) |

(52) U.S. Cl.
CPC ............ *C04B 20/0008* (2013.01); *C04B 7/02* (2013.01); *C04B 11/30* (2013.01); *C04B 24/42* (2013.01); *C04B 28/04* (2013.01); *C04B 28/06* (2013.01); *C04B 28/14* (2013.01); *C04B 2103/65* (2013.01); *C04B 2111/00155* (2013.01)

(58) Field of Classification Search
CPC ....... C04B 20/0008; C04B 7/02; C04B 11/30; C04B 24/42; C04B 28/04; C04B 28/06; C04B 28/14; C04B 2103/65; C04B 2111/00155; C04B 2111/00482; C04B 2111/28; C04B 28/08; C04B 28/10; C04B 28/02; C04B 28/065; C04B 14/42; C04B 14/46; C04B 14/4675; C04B 18/24; C04B 18/248; Y02W 30/91
See application file for complete search history.

(56) References Cited

U.S. PATENT DOCUMENTS

| | | | | |
|---|---|---|---|---|
| 2007/0056478 A1 | | 3/2007 | Miller et al. | |
| 2008/0087399 A1 | * | 4/2008 | Masaki | D21F 1/483 162/279 |
| 2018/0223546 A1 | | 8/2018 | Wasserfaller | |

FOREIGN PATENT DOCUMENTS

| | | | | | |
|---|---|---|---|---|---|
| CN | 101402517 A | | 4/2009 | |
| CN | 109437772 A | * | 3/2019 | C04B 28/04 |
| DE | 195 34 805 A1 | | 3/1997 | |
| FR | 2 903 398 A1 | | 1/2008 | |
| FR | 3 034 415 A1 | | 10/2016 | |
| JP | 2006-070546 A | | 3/2006 | |
| JP | 2009-505939 A | | 2/2009 | |
| JP | 4458871 B2 | * | 4/2010 | C04B 41/009 |
| JP | 2018-503577 A | | 2/2018 | |
| JP | 2019-081702 A | | 5/2019 | |
| JP | 2019-108788 A | | 7/2019 | |
| JP | 2020-164373 A | | 10/2020 | |
| RU | 2 044 718 C1 | | 9/1995 | |

OTHER PUBLICATIONS

International Search Report as issued in International Patent Application No. PCT/FR2022/050677, dated Jul. 19, 2022.
Office Action as issued in Japanese Patent Application No. 2023-562963, dated Feb. 3, 2026.

* cited by examiner

*Primary Examiner* — Anthony J Green
(74) *Attorney, Agent, or Firm* — CUSHMAN PARTNERS, LLC

(57) ABSTRACT

A composition includes flakes of mineral or plant-based wool, a powdered mineral binder and a water-repellent agent.

15 Claims, No Drawings

COMPOSITION FOR INSULATING COATING

CROSS-REFERENCE TO RELATED APPLICATIONS

This application is the U.S. National Stage of PCT/FR2022/050677, filed Apr. 11, 2022, which in turn claims priority to French patent application number 2103863 filed Apr. 14, 2021. The content of these applications are incorporated herein by reference in their entireties.

The invention relates to the field of construction. It relates more particularly to obtaining coatings that have good thermal insulation properties.

It is known to thermally insulate buildings from the outside, by arranging panels of insulating material, for example mineral wool or polystyrene, on the exterior walls of the buildings. This technique makes it possible, relative to indoor insulation, to save space for the occupants, as well as better thermal insulation due to the elimination of thermal bridges. Various construction systems are used for this purpose. Mention may in particular be made of ventilated facade systems, wherein facing plates are held by frames at a certain distance from the insulator, so as to create an air gap, or exterior insulation systems (ITE or ETICS), in which reinforcement and finishing plasters are directly placed in contact with the insulator. In these various techniques, the insulating panels are attached to the wall to be insulated either using mechanical fasteners or by means of adhesives.

These techniques are however complex and require significant installation time, in particular to secure the insulation and the facing plates. On-site cutting of the panels also generates large quantities of waste, and a poor junction between panels can lead to worse thermal insulation performance.

The purpose of the invention is to propose a construction technique and compositions suitable for this technique, which make it possible to thermally insulate facades more effectively, with a simpler and faster implementation.

To this end, the invention relates to a composition comprising flakes of mineral or plant-based wool, a powdered mineral binder and a water-repellent agent. The composition will generally be dry, that is, essentially consisting of a powder mixture.

The invention also relates to a method for obtaining an insulating coating on or against a support, comprising mixing such a composition with water and depositing the obtained mixture on or against said support.

Finally, an object of the invention is a building element comprising a support coated on one of its surfaces with an insulating coating comprising flakes of mineral wool or plant-based wool bonded together by a hardened mineral binder, and a water-repellent agent. Such an insulating coating is preferably obtained or likely to be obtained by the method according to the invention.

The use of a composition according to the invention for depositing, in particular by spraying, an insulating coating makes it possible to overcome the aforementioned disadvantages. Surprisingly, the invention also makes it possible to ensure good adhesion of the insulating coating to the walls (in particular, but not only, to concrete walls), good cohesion of the coating even for the large thicknesses generally required by the intended insulating performance, good resistance to the environment and to aging, as well as good mechanical properties, in particular in compression, for a reduced carbon impact and good thermal insulation properties.

After mixing the composition with water and hardening the mineral binder, the resulting coating comprises flakes of mineral wool or plant-based wool bonded together by a hardened mineral binder. The mineral binder powder present in the composition becomes pasty after being mixed with water, before hardening. The term "binder" therefore covers both the powder binder present in the composition and the hardened final binder in the final coating. The following details apply to both the composition and the final coating.

The mineral wool is preferably chosen from glass wools, slag wools and stone wools. The mineral wool fibers preferably have a chemical composition comprising 30 to 75% by weight of $SiO_2$, 5 to 40% CaO+MgO, 0-20% $Na_2O$+$K_2O$, 0-30% $Al_2O_3$, and 0-15% $Fe_2O_3$.

The use of glass wool generally makes it possible to achieve better thermal insulation performance, in particular by virtue of a lower density.

The glass wool is generally formed by electrical or flame-based melting of a mixture of powdered raw materials and cullet (recycled glass), then drawing, in particular by internal centrifuging by means of a fiberizing spinner. The fibers of the glass wool preferably have a chemical composition comprising 50-75% by weight of $SiO_2$, 12 to 20% $Na_2O$+$K_2O$, 5 to 20% CaO+MgO, 0-8%, in particular 0-3% $Al_2O_3$ and 2 to 10% $B_2O_3$.

Stone and slag wools are, for their part, generally formed by melting raw materials in the form of blocks or briquettes, or by melting powdered materials by electric heat or by submerged burners, then drawing by external centrifuging by means of a plurality of rotors. The stone wool fibers preferably have a chemical composition comprising 30-50% $SiO_2$, 10-26% $Al_2O_3$, 15-40% CaO+MgO, 0-5% $Na_2O$+$K_2O$ and 3-15% $Fe_2O_3$. The slag wool fibers preferably have a chemical composition comprising 30-45% $SiO_2$, 5-18% $Al_2O_3$, 30-60% CaO+MgO and 0-3% $Na_2O$+$K_2O$.

Mineral wool generally consists of interwoven glass fibers. As a general rule, the mineral wool used does not contain an organic binder. However, it may contain some when the flakes are derived from recycled waste from construction sites or from factories, for example obtained by grinding mineral wool panels. The flakes can be blowing wool flakes, which normally do not contain an organic binder, but which may nevertheless contain organic additives, for example of the silicone type or an antistatic agent. These additives are in particular sprayed onto the mineral wool at the time of fiberizing.

Plant-based wool comprises plant fibers, preferably selected from the group consisting of lignocellulosic fibers and cotton fibers. The lignocellulosic fibers are preferably selected from wood fibers, hemp fibers, flax fibers, sisal fibers, cotton fibers, jute fibers, coconut fibers, raffia fibers, abaca fibers, cereal straw, rice straw, and mixtures thereof.

Flakes are understood to mean pieces formed of agglomerates (or clusters) of entangled fibers having a certain size or dimension. It is essential that the composition and the coating comprise fibers in the form of flakes and not in the form of dispersed individual fibers or fibers arranged in layers, grids, fabrics or nonwovens, in order to be able to achieve good thermal insulation properties. The coating therefore differs from a fiber-reinforced plaster or mortar, which does not have insulating properties.

The flakes of mineral or plant-based wool, in the composition and/or the coating, preferably have a size of between 1 and 10 cm, in particular between 2 and 8 cm, or even between 3 and 7 cm. Flakes of too small a size lead to denser coatings, which are therefore less thermally insulating. Obtaining the flakes and adjusting their size may in particular be carried out by means of a machine. The flakes may be larger in the composition, in the case where the spraying machine is able to reduce their size before spraying.

The powdered mineral binder is preferably a hydraulic binder.

The hydraulic binder is preferably selected from the group consisting of Portland cements, belite cements, aluminous cements, sulfoaluminate cements, pozzolan blend cements, slags, fly ash, metakaolins, hydraulic lime, sources of calcium sulfate, and mixtures of two or more of these hydraulic binders. The source of calcium sulfate is in particular chosen from gypsum, anhydrite, hemihydrate and mixtures thereof.

The binder may in particular consist of Portland cement, in particular of the CEM I or CEM II type.

According to another embodiment, the binder comprises (in particular consists of) a mixture of Portland cement and a source of calcium sulfate. The presence of a source of calcium sulfate makes it possible in particular to improve the fire resistance properties and to accelerate the setting of the binder. Its carbon impact is also reduced compared with Portland cement. The total proportion of the source of calcium sulfate in the binder is preferably between 2 and 20% by weight, in particular between 5 and 15% by weight.

According to another embodiment, the binder comprises (in particular consists of) a mixture of sulfoaluminate cement and a source of calcium sulfate. The binder then preferably comprises a setting accelerator, for example a lithium salt. The total proportion of the source of calcium sulfate in the binder is preferably between 2 and 20% by weight, in particular between 5 and 15% by weight.

According to yet another embodiment, the binder comprises (or consists of) a mixture of Portland cement, aluminate cement and a source of calcium sulfate. The binder may also comprise a setting accelerator, for example a lithium salt. Such a binder makes it possible to finalize the hardening more quickly. In this embodiment, the weight proportions of the constituents in the binder are preferably the following: 65 to 90% Portland cement, 5 to 20% aluminate cement and 2 to 15% a source of calcium sulfate.

In general, the presence of Portland cement makes it possible to achieve good mechanical performance, particularly in terms of compressive strength, and also makes it possible to achieve high pH values which have proved to enhance the efficiency of the water-repellent agents. Adding a source of lime to the aforementioned binders is also beneficial in this respect.

The binder may also consist of a source of calcium sulfate, making it possible to obtain good fire resistance properties, but to the detriment of the mechanical and thermal insulation properties.

Alternatively, the mineral binder may be a clay binder.

The water-repellent agent is essential to afford the coating good resistance to aging, in particular when the coating is arranged on the outside of buildings. It would appear that its presence makes it possible to limit the undesirable interactions between the binder, which is highly alkaline, and mineral wool fibers, which are sensitive to alkaline media.

Particularly preferably, the water-repellent agent comprises (or consists of) an organosilicon compound, in particular comprising silane and/or siloxane, monomeric, dimeric, oligomeric or polymeric groups.

Such water-repellent agents proved to be much more effective than other known water-repellent agents such as sodium, potassium or calcium fatty acid salts, for example calcium stearate or sodium oleate.

The organosilicon compound is preferably chosen from:

- organosilanes, such as tetraorganosilanes, of formula $SiR_4$, for example, tetraalkylsilanes,
- organosiloxanes, such as tetraorganosiloxanes, of formula $Si(OR)_4$, for example, tetraalkoxysilanes such as tetramethoxysilane and tetraethoxysilane,
- organoorganoxysilanes, in particular of formula $SiR_n(OR')_{4-n}$ where n=1 to 3, such as alkylalkoxysilanes, in particular isooctyltriethoxysilane, n-octyltriethoxysilane or hexadecyltriethoxysilane,
- organosilanols, in particular of formula $SiR_n(OH)_{4-n}$
- oligosilanes and polysilanes,
- oligosiloxanes and polysiloxanes (also known as silicone resins, e.g. methylsilicone, ethylsilicone, phenylsilicone or H-silicone resins), in particular comprising at least one unit of the general formula $R_aH_bSi(OR')_c(OH)_dO_{(4-a-b-c-d)/2}$, where a=0 to 3, b=0 to 1, c=0 to 3, d=0 to 3 and $a+b+c+d \leq 3.5$, wherein, in the abovementioned formulae, the radicals R are identical or different and represent branched or unbranched alkyl radicals having from 1 to 22 carbon atoms, cycloalkyl radicals having from 3 to 10 carbon atoms, alkylene radicals having from 2 to 4 carbon atoms, or aryl, aralkyl, alkylaryl radicals having from 6 to 18 carbon atoms, and the radicals R' are identical or different alkylene and alcoxyalkylene radicals each having from 1 to 4 carbon atoms, preferably methyl and ethyl, the radicals R and R' also being able to be substituted with halogens such as Cl, with ether, thioether, ester, amide, nitrile, hydroxyl, amine, carboxyl, sulfonic acid, carboxylic anhydride and carbonyl groups.

The water-repellent agent is preferably in powder form. It may for example comprise the organosilicon compound and an inorganic or organic solid support. Possible inorganic supports are for example based on silica (such as precipitated silica or fumed silica), carbonates or talc. They are preferably porous, with a BET surface area preferably of at least 50 $m^2/g$, or even of at least 100 $m^2/g$.

The water-repellent agent may also be a redispersible powder. It may then comprise polymers, in addition to the organosilicon compound. These polymers are for example based on one or more monomers selected from the group comprising vinyl esters (in particular vinyl esters of non-branched or branched alkylcarboxylic acids having from 1 to 15 carbon atoms), methacrylates and acrylates (in particular (meth)acrylates of alcohols having from 1 to 10 carbon atoms), methacrylic acid, acrylic acid, vinyl aromatics, olefins, dienes and vinyl halides. The powder may also contain water-soluble protective colloids, fatty acids and/or anti-blocking agents.

Particularly effective water-repellent agents in the context of the invention are sold in particular by the company Wacker Chemie AG under the product names Silres® Powder A and D.

The water-repellent agent may be added in powder form to the composition, and/or be present in the form of a coating on the surface of the fibers of the mineral wool.

The composition according to the invention may comprise other constituents.

It may particularly comprise lightening fillers, in particular chosen from perlite, vermiculite, expanded glass beads, expanded polystyrene beads, cenospheres, expanded silicates, aerogels and mixtures thereof.

The composition advantageously comprises redispersible polymer powders. The polymer is preferably based on one or more monomers selected from vinyl esters (in particular vinyl esters of C1-C15 carboxylic acids such as vinyl acetate), (meth)acrylates (in particular of C1-C10 alcohols), vinyl aromatics, alkenes (for example ethylene), dienes and vinyl halides. These polymers make it possible to improve the mechanical strength of the coating, without affecting its thermal insulation properties.

The composition advantageously comprises thickening agents, which also make it possible to improve the mechanical strength of the coating without affecting its thermal insulation properties, and to obtain better cohesion. The thickening agent is preferably a cellulose ether.

The composition may also comprise surfactants, in particular in order to facilitate the wetting of the fibers by water during the implementation of the coating deposition method. An advantageous surfactant is in particular sodium dodecyl sulfate.

The composition may further comprise mineral or plant-based oils, in order to reduce dust emissions, in particular when the binder contains a source of calcium sulfate such as gypsum.

The content by weight of mineral or plant-based wool is preferably between 50 and 90%, in particular between 55 and 85%, relative to the total weight of mineral or plant-based wool and mineral binder, or even the total weight of the composition or of the coating. Considering the low density of the flakes of mineral or plant-based wool relative to the binder, the mineral wool is very markedly predominant by volume, making it possible to achieve good thermal insulation properties.

The content by weight of mineral binder is preferably between 10 and 50%, in particular between 15 and 45%, relative to the total weight of mineral or plant-based wool and mineral binder.

In the case of slag wool, the mass proportion of wool relative to the binder preferably varies from 70:30 to 90:10. In the case of glass wool, the mass proportion of wool relative to the binder preferably varies from 50:50 to 70:30.

The content by weight of water-repellent agent is preferably between 0.1 and 2%, in particular between 0.5 and 1.8%, or even between 0.7% and 1.6%, relative to the total weight of mineral wool and mineral binder.

The composition and/or the coating therefore preferably comprise 50 to 90% by weight of mineral or plant-based wool, 10 to 50% by weight of mineral binder and 0.1 to 2% of water-repellent agent, relative to the cumulative weight of mineral or plant-based wool and mineral binder.

The total content of possible additives in the composition is normally less than 40%, or even 30% and even at 20% or 10%, or greater than 0.1%, still relative to the total weight of mineral or plant-based wool and mineral binder. It is preferably no more than 5% for redispersible polymer powders and thickeners, and at most 2% for oils. In other words, the total proportion by weight of mineral or plant-based wool and mineral binder in the composition or the coating is preferably at least 70%, in particular at least 80% and even at least 90%. The additives, or at least some of them, may alternatively be added to the water used for spraying.

The content levels indicated above apply to both the composition and the final coating.

The composition is mixed with water and the mixture obtained is then deposited on or against a support.

The mixture is preferably deposited by spraying. Preferably, the composition is conveyed to a spray nozzle (in dry form), and the water is added as soon as possible to the outlet of the nozzle. Use is advantageously made of a spraying machine provided with a central duct through which the composition is sprayed, around which at least one orifice is arranged, in particular a plurality of orifices, through which the water is sprayed. The mixing of the composition and the water is then carried out at the nozzle outlet, before the mixture reaches the support.

The amount of water (by weight) relative to the amount of composition is preferably between 0.2 and 1.5, in particular between 0.5 and 1.4, or even between 0.7 and 1.2. The amount of water must be sufficient for the setting and hardening of the binder. It is to be adjusted by taking into account the fact that the mineral or plant-based wool will absorb part of the water. If the amount of water added is too low, the composition does not adhere sufficiently to the support and detaches. As indicated above, the water may also contain additives, such as polymers or surfactants. Preferably, the water does not comprise any adhesive.

The total flow rate of dry matter (mineral or plant-based wool, mineral binder and optional solid additives) is preferably between 1 and 10 kg/min, in particular between 2 and 8 kg/min. The water flow rate is preferably between 5 and 10 L/min. The laying speed is for example between 0.1 and 1 $m^2$/min for a coating thickness of 140 mm.

The support is preferably vertical. It is preferably an exterior wall of a building, and the deposition is carried out on the exterior surface of said wall. "Exterior wall" refers to a wall separating the inside of the dwelling from the outside. "Exterior surface" refers to the surface facing the outside of the dwelling. The coating, thanks to its insulating, mechanical properties and resistance to aging, can then replace the panels of insulating materials in ventilated facade systems and the exterior thermal insulation described in the introduction. The wall is advantageously a wall manufactured by an additive manufacturing technique (also called "3D printing"). In such a case, the texturing created by this technique (linked to the fact that mortar layers are successively deposited on one another) makes it possible to improve the adhesion of the coating.

The building element then comprises an exterior wall coated on its exterior surface with the insulating coating. The element may further comprise a framework (wood or metal) making it possible to attach and secure a facing, while providing an air gap between the insulating coating and the facing. The facing may be of any type: glass, metal, wood, PVC, ceramics, etc. Alternatively, the element may comprise, directly on the insulating coating, a reinforcement plaster, generally comprising a reinforcing mesh, and a finishing plaster or a facing.

However, the invention is not limited to this application, and the coating may also be deposited onto a horizontal support, for example to insulate a ceiling from below.

The insulating coating preferably has a thickness of between 30 and 300 mm. A small thickness, for example 30 mm, may be sufficient for fire resistance properties, but will not be for thermal insulation properties. The thickness of the coating is therefore preferably at least 40 mm and even at least 50 or 60 mm. The spraying technique mentioned above makes it possible in one pass to achieve thicknesses up to 240 mm. The thickness of the coating is therefore advantageously between 60 and 240 mm. Beyond this, a second pass will generally be necessary.

The density of the coating is preferably between 50 and 250 kg/$m^3$, preferably between 60 and 200 kg/$m^3$. The thermal conductivity of the coating is preferably between 35 and 60 mW/m·K. When the mineral wool is stone wool or slag wool, this density is preferably between 100 and 200 kg/$m^3$, with a thermal conductivity ranging in particular from 37 to 60 mW/m·K. When the mineral wool is glass wool, the density of the coating is preferably between 50 and 100 kg/m$^3$, in particular between 60 and 80 kg/m$^3$, for thermal conductivities ranging in particular from 35 to 40 mW/m·K.

The mechanical strength of the coating is excellent, with strengths ranging in particular from 5 to 20 kPa in tension, from 5 to 60 kPa in bending (in particular from 40 to 60 kPa with slag wool or stone wool) and from 20 to 110 kPa in compression (in particular from 90 to 110 kPa with slag wool or stone wool).

The following non-limiting examples illustrate the invention and its advantages.

Different compositions were projected against walls made of cinder block, plywood, sandstone, and tiles, with or without adhesion primer. The distance between the spray gun and the wall was 100 to 120 cm. The sprayed thickness was 160 to 180 mm, reduced to 140 mm by removing excess then smoothed with a float. Adhesion to the different substrates proved to be very good.

COMPARATIVE EXAMPLE

In this comparative example, the composition comprised 80% by weight of slag wool flakes sold by the Applicant under the name Coatwool, 18% CEM I and 2% hemihydrate cement, further with an addition of 0.59% cellulose ether (tylose) and of 1% mineral oil. The dry matter flow rate was 8 kg/min, the water flow rate was 6 kg/min.

Example 1

In example 1, the sprayed composition comprised 66.7% glass blowing wool flakes sold by the Applicant under the name Comblissimo, 30% cement CEM I, 3.3% hemihydrate, plus an addition of 0.82% cellulose ether (tylose) and 1% of mineral oil. The blowing wool comprised from 0.1 to 0.4% water-repellent agent (silicone), 1 to 2% mineral oil and 0.2% antistatic agent, these agents being dispersed on the fibers. The dry matter flow rate was 2.5 to 3 kg/min, and the water flow rate was 5 kg/min.

Example 2

In example 2, the sprayed composition comprised 80% by weight of slag wool flakes (Coatwool), 18% CEM I and 2% hemihydrate cement, also with an addition of 1% water-repellent agent (Silres® d) and 1% mineral oil. The dry matter flow rate was 8 kg/min, and the water flow rate was 5 kg/min.

Example 3

In example 3, the sprayed composition comprised 66.7% slag wool flakes, 30% CEM I and 3.3% hemihydrate cement, also with an addition of 1.66% water-repellent agent (Silres® d) and 1% mineral oil. The dry matter flow rate was 2.5 kg/min and the water flow rate was 6 kg/min.

Table 1 below indicates for each example the density (MV) of the coating obtained (in kg/m$^3$), the thermal conductivity (λ) of the coating (in mW/m·K), the water absorption, denoted W, after 1 hour and 24 hours (in kg/m$^2$) measured according to ISO 29767, the 3-point bending resistance (in kPa), the compressive strength (in kPa) and the tensile strength (in kPa).

TABLE 1

| | Comp. | 1 | 2 | 3 |
|---|---|---|---|---|
| MV (kg/m$^3$) | 190 | 70 | 190 | 150 |
| λ (mW/m · K) | 48 | 37 | 44 | 46 |
| W-1 h (kg/m$^2$) | 31 | 1.6 | 0.1 | 0.1 |
| W-24 h (kg/m$^2$) | — | 3.8 | 0.1 | 0.1 |
| Bending (kPa) | 52 | 6 | 28 | 35 |
| Compressive (kPa) | 78 | 25 | 33 | 54 |
| Tensile (kPa) | 7 | 2 | 7 | 14 |

The invention claimed is:

1. A composition comprising flakes of mineral or plant-based wool, a powdered mineral binder and a water-repellent agent, wherein the composition comprises 50 to 90% by weight of mineral or plant-based wool, 10 to 50% by weight of mineral binder and 0.1 to 2% by weight of water-repellent agent, relative to a cumulative weight of mineral or plant-based wool and mineral binder.

2. The composition according to claim 1, wherein the mineral wool is chosen from glass wools, slag wools and stone wools.

3. The composition according to claim 1, wherein the flakes of mineral or plant-based wool have a size of between 1 and 10 cm.

4. The composition according to claim 1, wherein the powdered mineral binder is a hydraulic binder.

5. The composition according to claim 4, wherein the powdered mineral binder comprises a mixture of Portland cement, a source of calcium sulfate, and optionally aluminate cement.

6. The composition according to claim 1, wherein the water-repellent agent comprises an organosilicon compound.

7. The composition according to claim 1, wherein the water-repellent agent is in powder form.

8. The composition according to claim 6, wherein the water-repellent agent comprises an organosilicon compound and an inorganic or organic solid support, or is a redispersible powder.

9. The composition according to claim 1, further comprising redispersible polymer powders and/or surfactants.

10. The composition according to claim 4, wherein the hydraulic binder is selected from the group consisting of Portland cements, belite cements, aluminous cements, sulfoaluminate cements, pozzolan blend cements, fly ash, metakaolins, hydraulic lime and mixtures of two or more of these hydraulic binders.

11. The composition according to claim 6, wherein the organosilicon compound comprises silane and/or siloxane, monomer, dimeric, oligomeric or polymeric groups.

12. A method for obtaining an insulating coating on or against a support, comprising mixing a composition according to claim 1 with water and depositing the mixture obtained on or against said support.

13. The method according to claim 12, wherein the deposition of the mixture is carried out by spraying, the composition being conveyed to a spray nozzle, and the water being added as soon as possible to an outlet of the nozzle.

14. The method according to claim 12, wherein the support is vertical, the deposition being carried out on the exterior surface of said wall.

15. The method according to claim 14, wherein the support is vertical is an exterior wall of a building.

* * * * *